United States Patent [19]

Asada et al.

[11] Patent Number: 5,497,199
[45] Date of Patent: Mar. 5, 1996

[54] APPARATUS FOR PROCESSING PROGRESSIVE SCANNING VIDEO SIGNAL COMPRISING PROGRESSIVE TO INTERLACED SIGNAL CONVERTER AND INTERLACED TO PROGRESSIVE SIGNAL CONVERTER

[75] Inventors: Ryoji Asada, Hirakata; Kunio Sekimoto, Katano, both of Japan

[73] Assignee: Matsushita Electric Industrial Co., Ltd., Osaka, Japan

[21] Appl. No.: 325,828

[22] Filed: Oct. 19, 1994

[30] Foreign Application Priority Data

Oct. 20, 1993 [JP] Japan ................................. 5-262138

[51] Int. Cl.$^6$ .................................................. H04N 7/01
[52] U.S. Cl. .......................................... 348/446; 348/448
[58] Field of Search ................................. 348/441, 446, 348/448, 458; H04N 7/01

[56] References Cited

U.S. PATENT DOCUMENTS

| | | | |
|---|---|---|---|
| 4,620,225 | 10/1986 | Wendland et al. | 348/446 |
| 5,031,042 | 7/1991 | Rabii | 358/167 |
| 5,081,532 | 1/1992 | Rabii | 358/105 |
| 5,093,721 | 3/1992 | Rabii | 358/135 |
| 5,124,794 | 6/1992 | Rabii | 358/166 |
| 5,307,164 | 4/1994 | Dong-Il | 348/448 |
| 5,327,235 | 7/1994 | Richards | 348/441 |
| 5,337,089 | 8/1994 | Fisch | 348/448 |
| 5,402,186 | 3/1995 | Kawai | 348/448 |

OTHER PUBLICATIONS

Kimata et al., "NTSC–Compatible Wide Aspect Image Transmission Method"—NTV Mode 1.5—, ITE Technical Report vol. 15, No. 18, pp. 37–42, BCS'91-7, Mar. 1991.
Hori et al., "Component Studio System for EDTV", ITC Technical Report vol. 17, No. 7, pp. 7–12, BCS'93-2, Jan. 1993.

Primary Examiner—Victor R. Kostak
Attorney, Agent, or Firm—Willian Brinks Hofer Gilson & Lione

[57] ABSTRACT

An apparatus for processing a progressive scanning video signal comprising a progressive to interlaced signal converter is provided. An input progressive scanning video signal is switched over alternately every one horizontal scanning line of progressive scanning so as to be divided into a main original signal and a sub-original signal. A time interval of the main original signal is expanded so as to convert the main original signal into a main signal having a period of horizontal scanning of interlaced scanning, whereas a time interval of the sub-original signal is expanded so as to convert the sub-original signal into a sub-signal having the period of the horizontal scanning of the interlaced scanning. Further, a synchronizing process is performed on the time-expanded main signal and the time-expanded sub-signal so as to output an interlaced scanning signal including the main signal and the sub-signal in synchronous with each other, and so that the main signal and the sub-signal start respectively from a pair of two horizontal lines which is continuously inputted after the first horizontal scanning line of the input progressive scanning video signal.

9 Claims, 16 Drawing Sheets

Input Progressive Scanning Signal S0

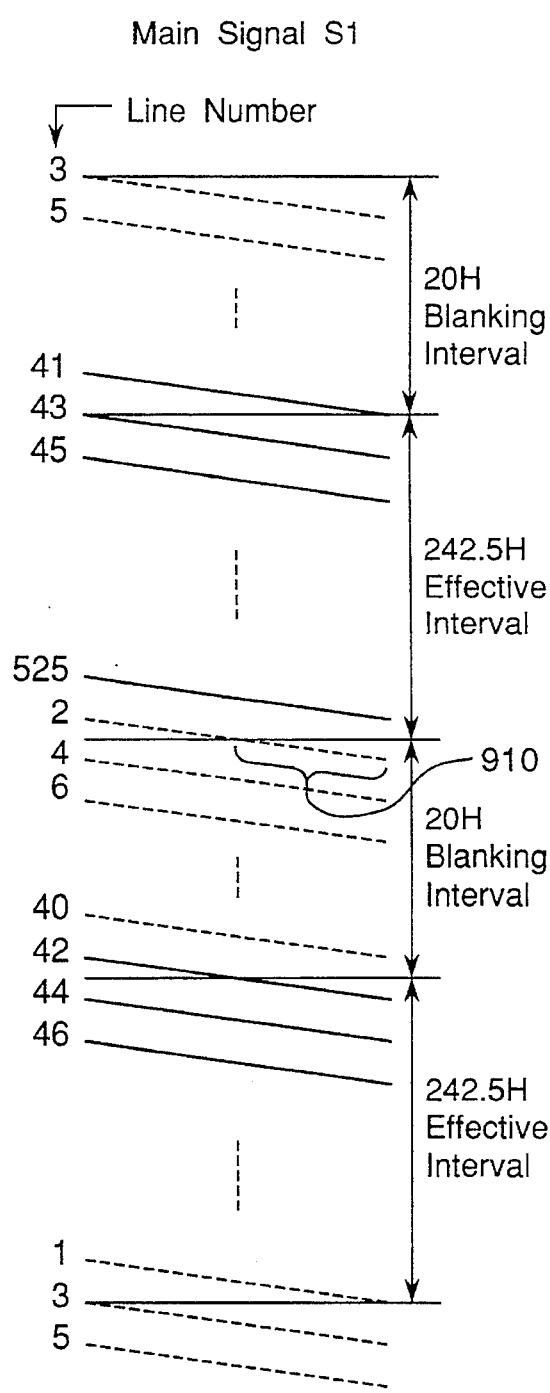
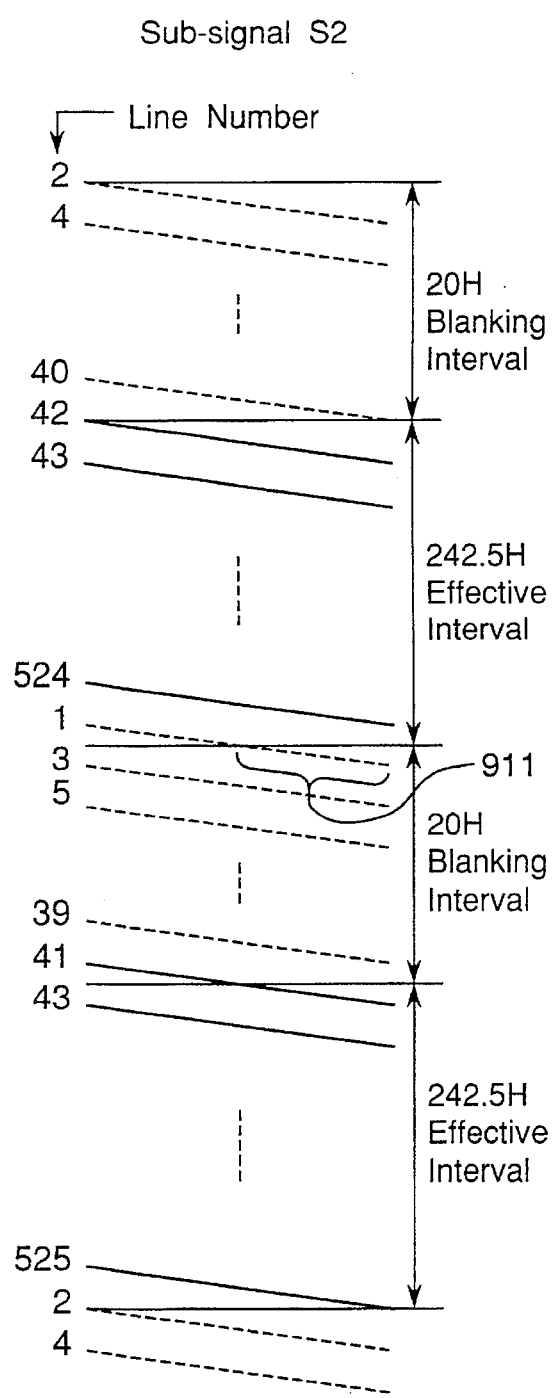

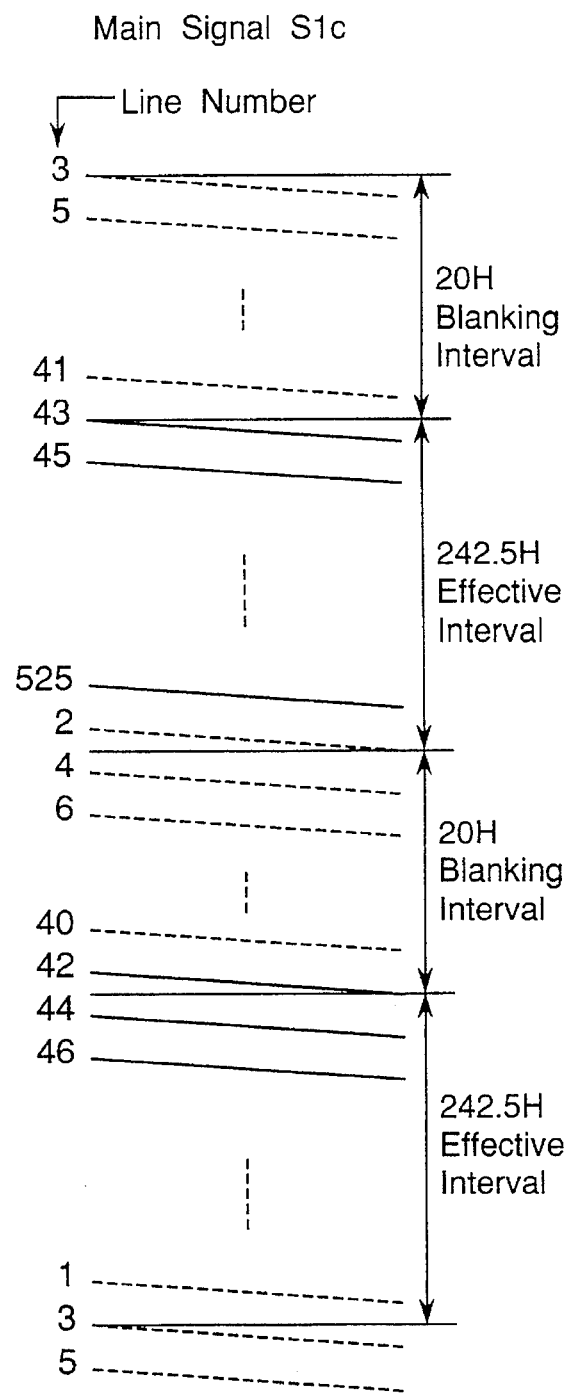
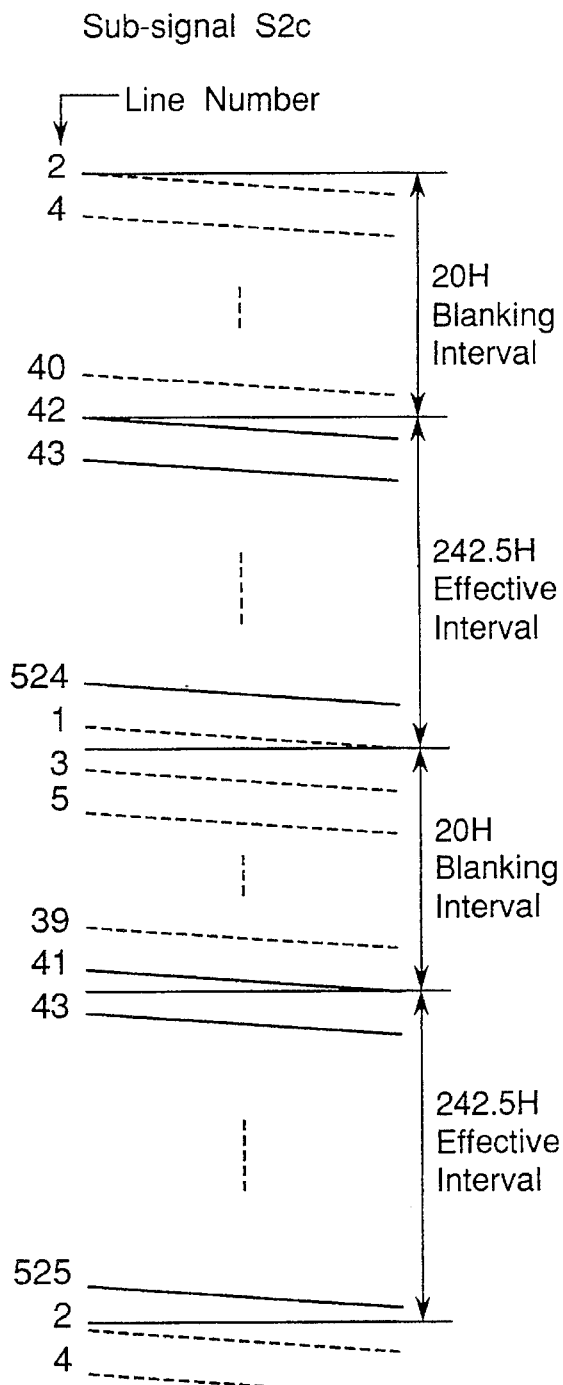

Combined Progressive Scanning Signal S3'

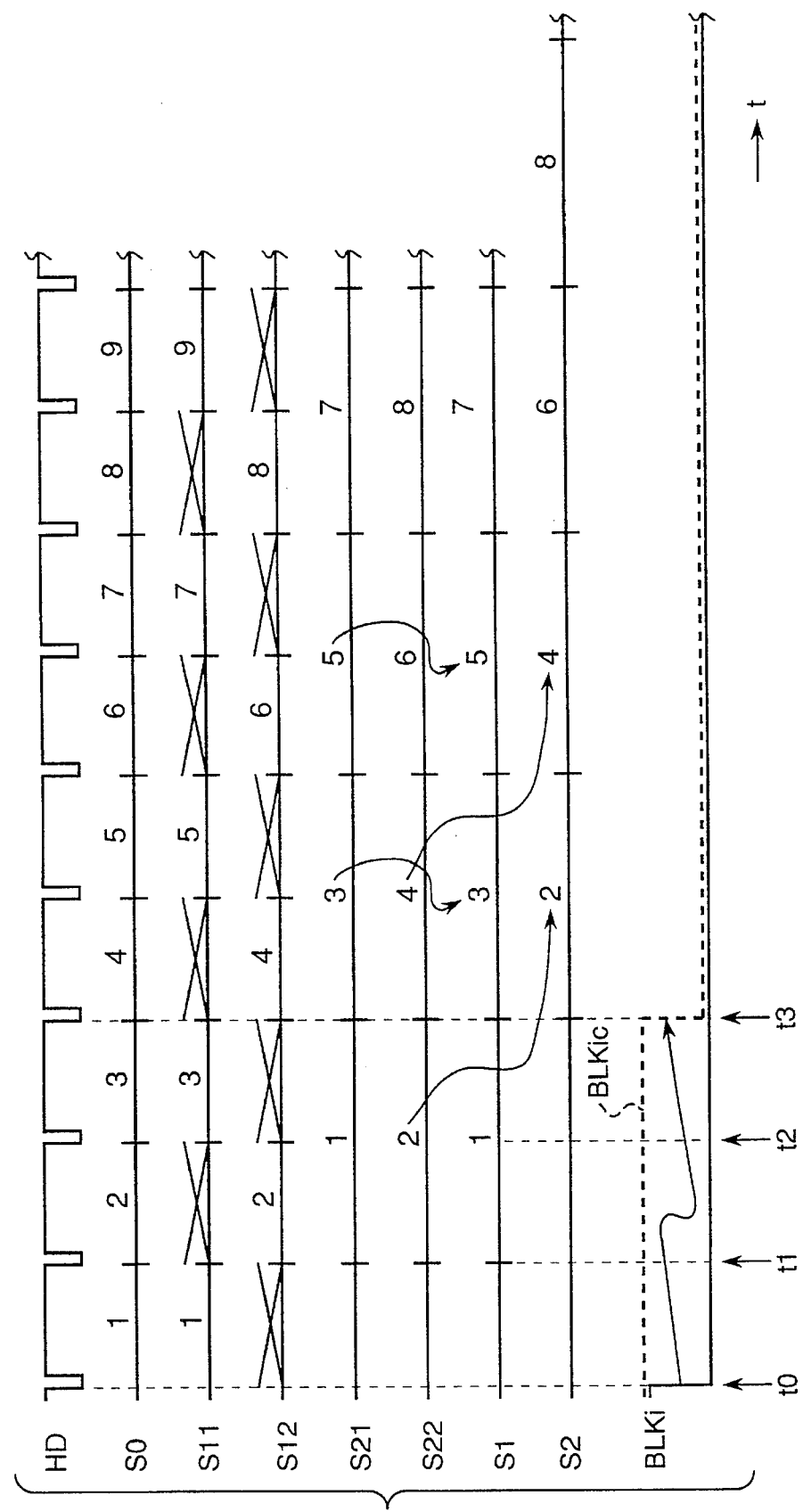

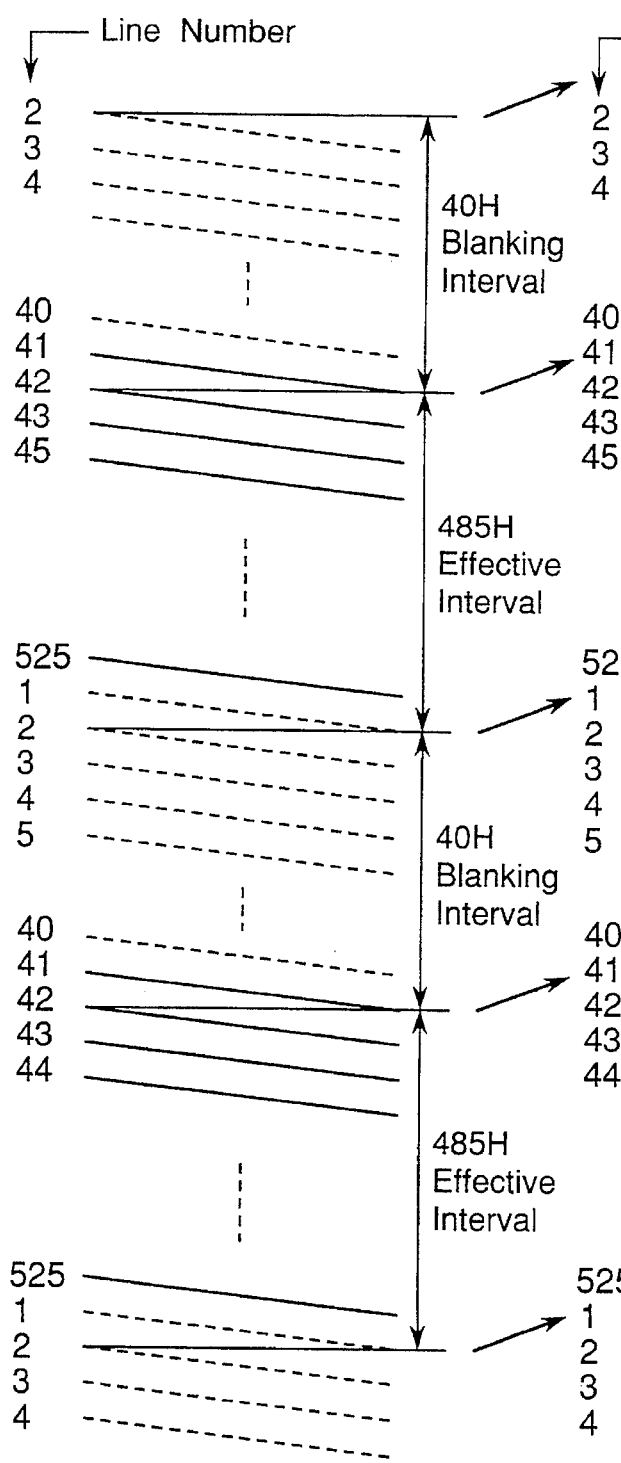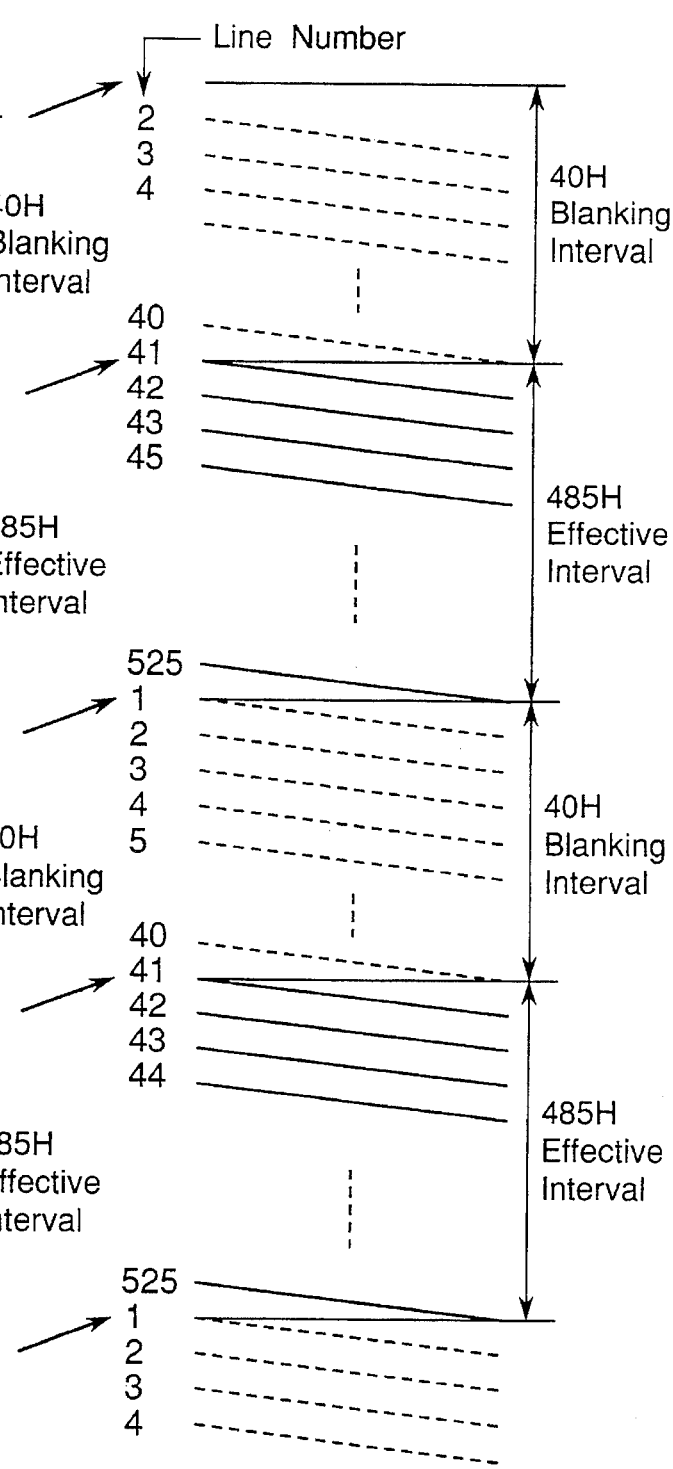

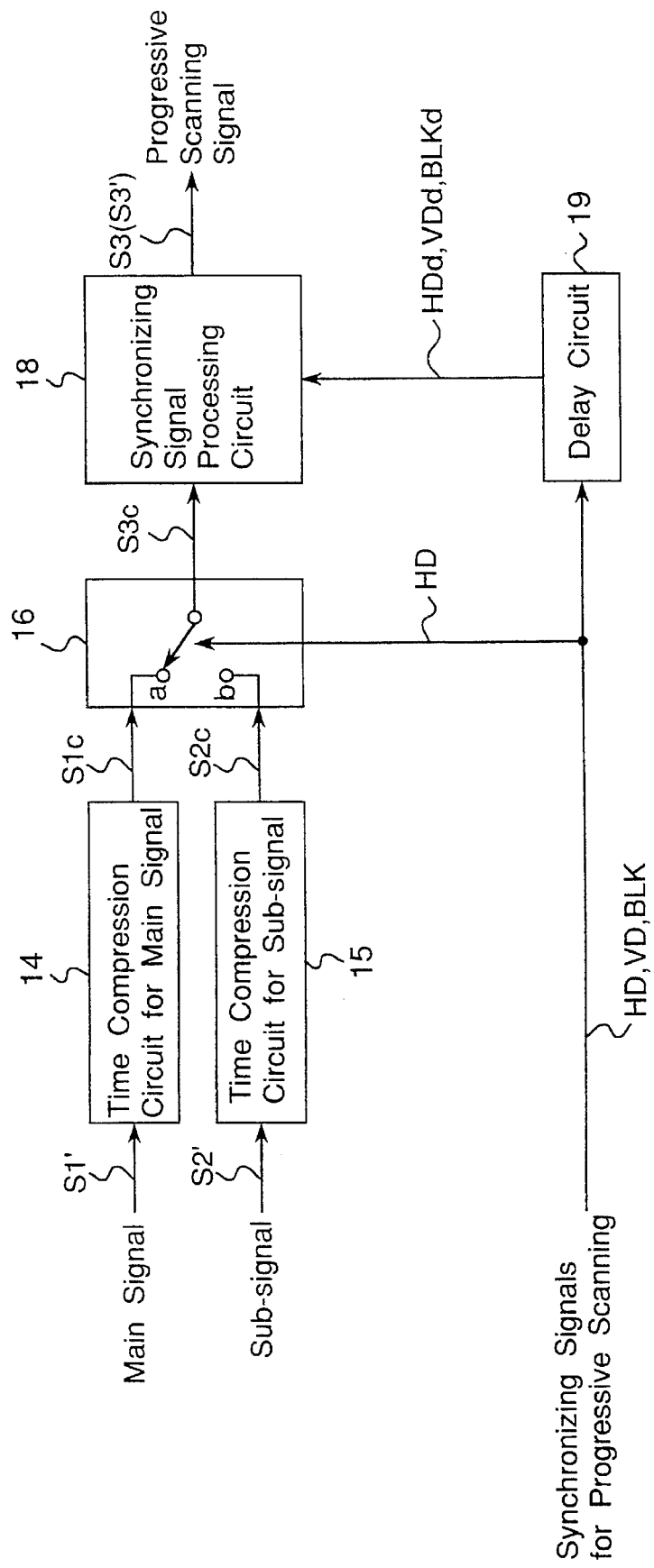
Fig. 6  Interlaced to Progressive Signal Converter 5

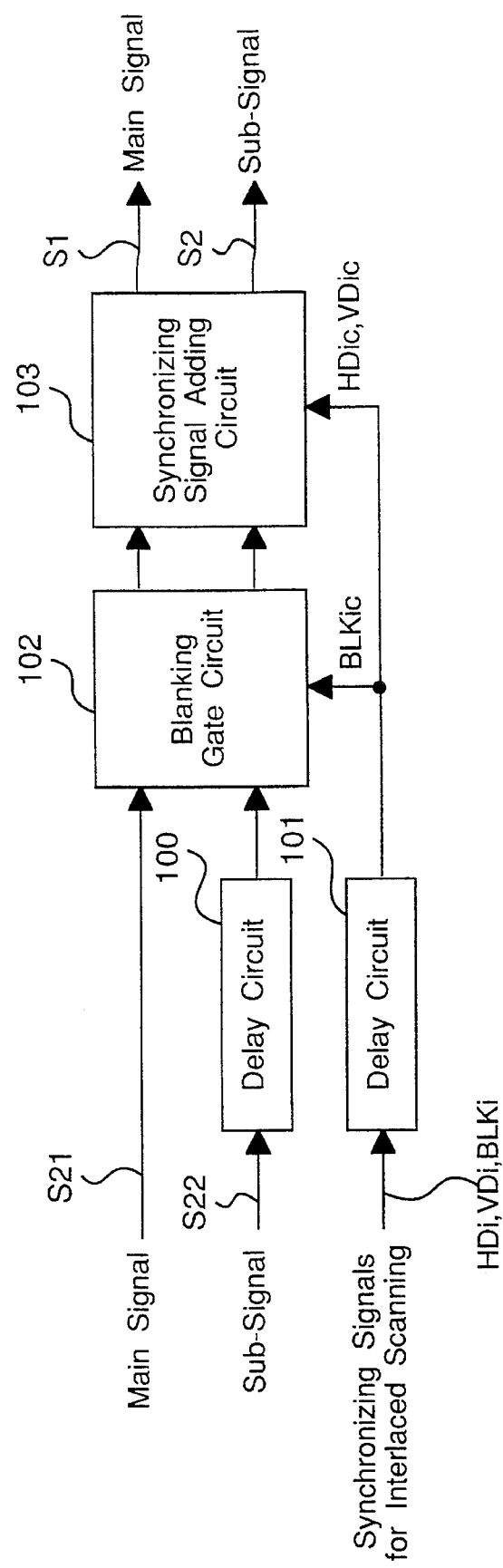
Fig.8 Synchronizing Signal Processing Circuit 12

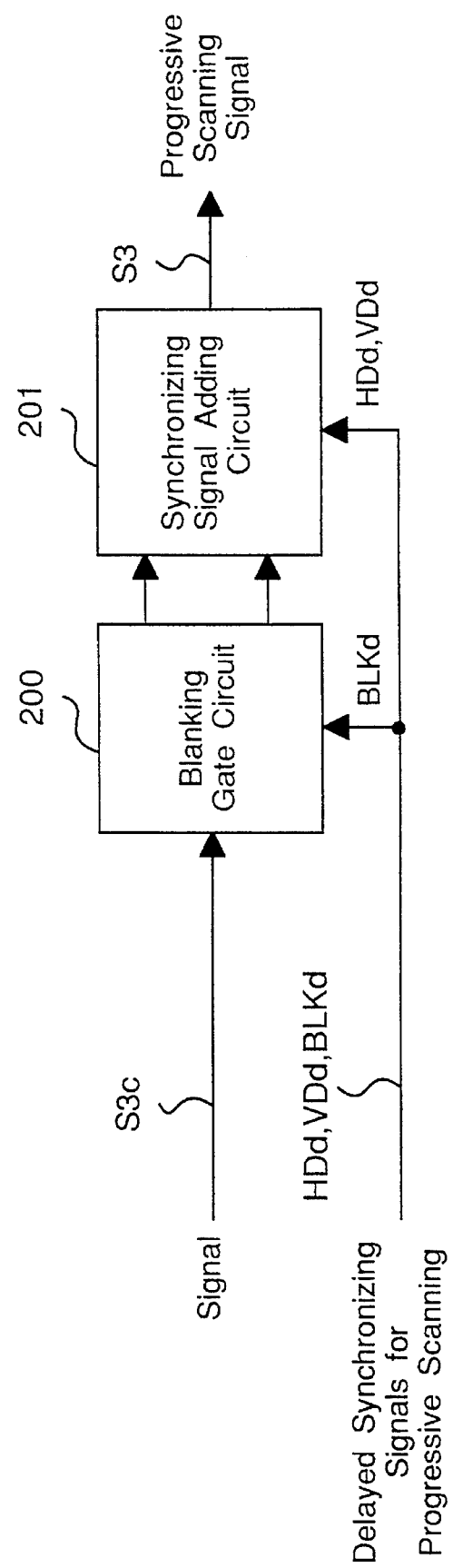

Input Progressive Scanning Signal

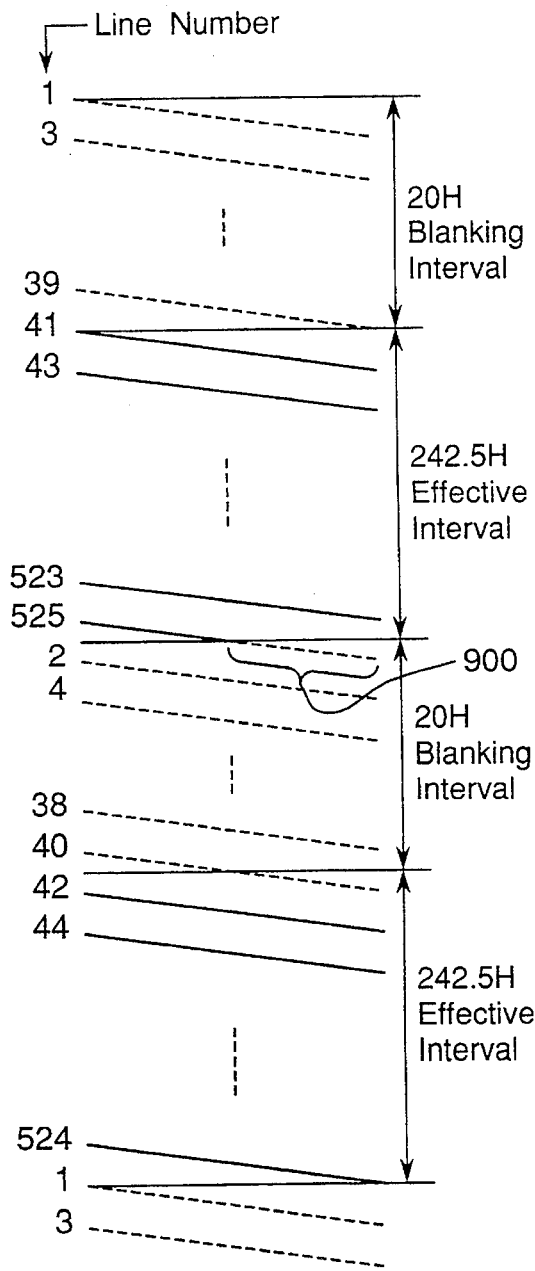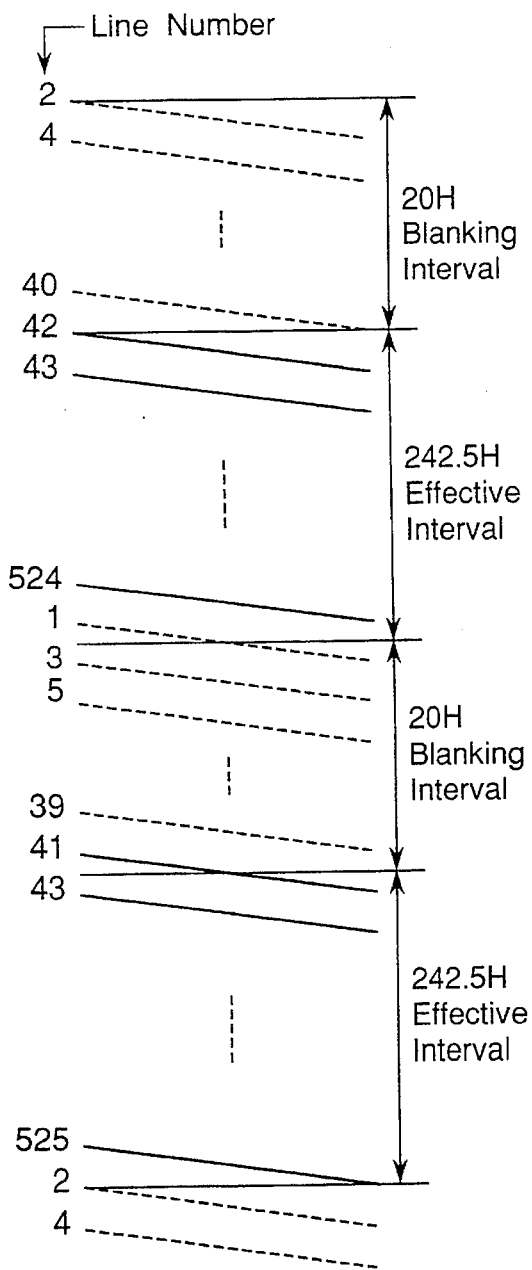

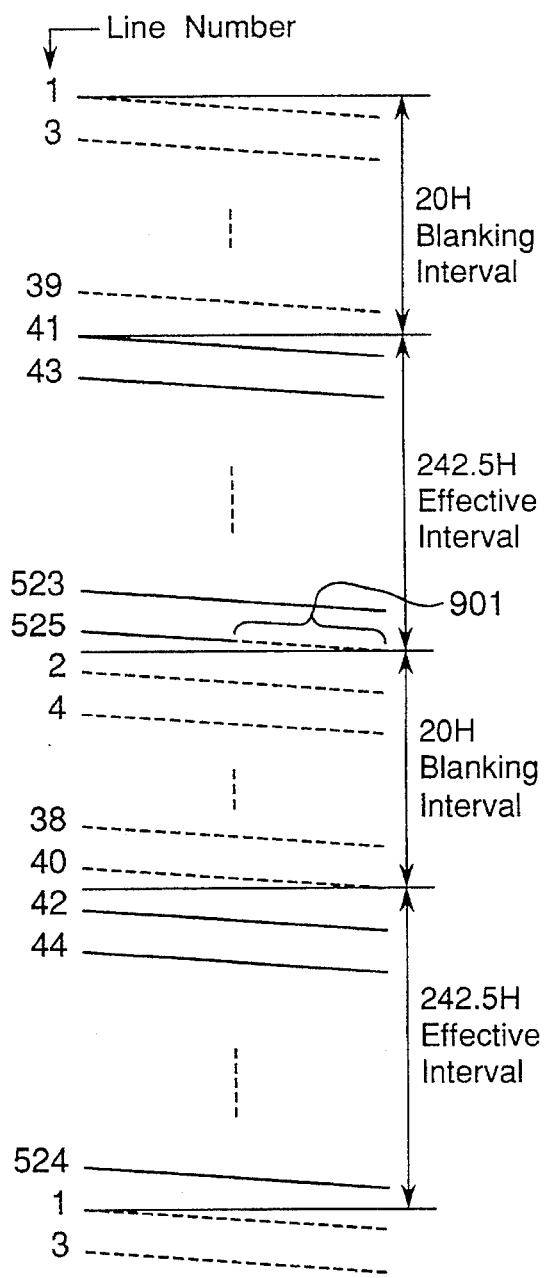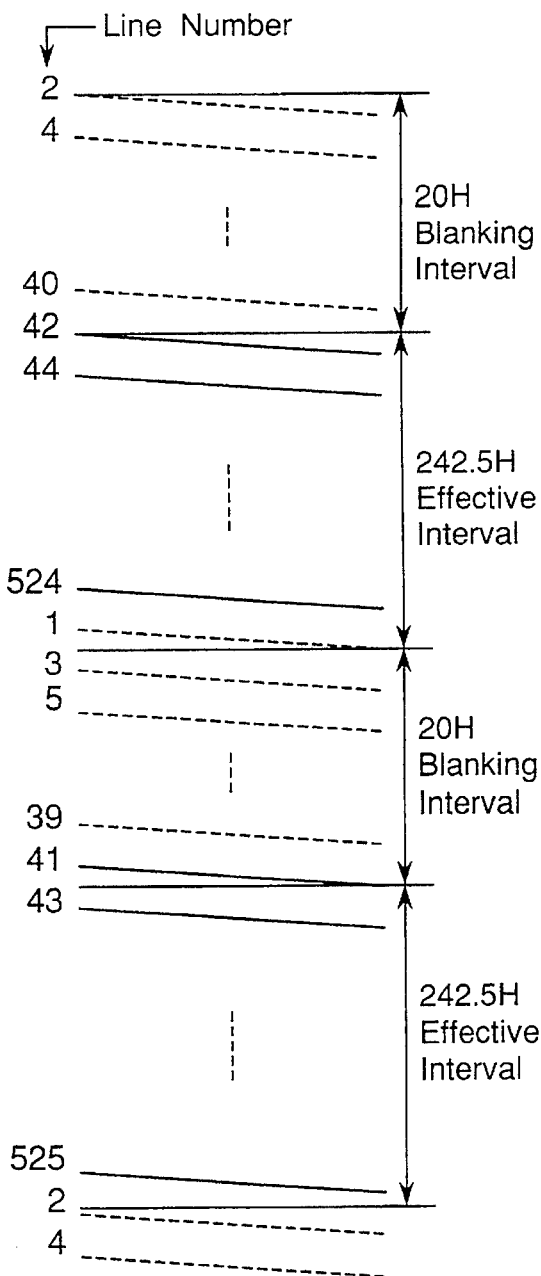

Combined Progressive Scanning Signal 4,497,199

APPARATUS FOR PROCESSING PROGRESSIVE SCANNING VIDEO SIGNAL COMPRISING PROGRESSIVE TO INTERLACED SIGNAL CONVERTER AND INTERLACED TO PROGRESSIVE SIGNAL CONVERTER

BACKGROUND OF THE INVENTION

1. Field of the Invention

The present invention relates to an apparatus for processing a progressive scanning video signal, and in particular, to an apparatus for processing a progressive scanning video signal, comprising at least one of a progressive to interlaced signal converter and an interlaced to progressive signal converter, wherein the apparatus therefor is used for television broadcasting systems of the next generation such as the EDTV2 system or the like. In the specification, a progressive scanning video signal is referred to as a progressive scanning signal hereinafter, and an interlaced scanning video signal is referred to as an interlaced scanning signal hereinafter.

2. Description of the Related Art

Recently, as television broadcasting systems of the next generation, progressive scanning signals have been adapted in parts of the EDTV2 system in Japan and the ATV (Advanced Television) proposed system in U.S.A. in addition to a television system having a widened picture screen. Heightening the quality of image in the vertical direction is achieved by using the progressive scanning signals. In the case of the EDTV2 television system having a widened picture screen in Japan, a progressive scanning signal sent from a signal source is converted into an interlaced scanning signal according to a so-called letter box system, and then the converted interlaced scanning signal is transmitted. In this case, the vertical high frequency components of the luminance signal and the high frequency components of the vertical moving picture are superimposed on non-picture portions positioned at the top and bottom of the picture screen (referred to as top and bottom non-picture potions hereinafter), and the image of the letter box signal is displayed on a display unit having an aspect ratio of 4:3 of a television set of the current system. Then a widened picture having an aspect ratio of 16:9 is obtained by the main signal of the center picture in the display unit (referred to as a center main signal hereinafter). Therefore, the EDTV2 system can be compatible with the current broadcasting television system in Japan.

Further, in an existing widened interlaced type television set, the center main signal is enlarged in the vertical direction, resulting in a widened picture on the display unit. However, the vertical resolutions in both the above-mentioned systems deteriorate as compared with that of the picture of the current broadcasting television system.

On the other hand, in a television set for displaying only a widened picture of a progressive scanning signal, a progressive scanning signal is recovered from a main signal and a signal of the top and bottom non-picture portions of the letter box signal which is an interlaced scanning signal, and then a progressive scanning wide picture can be displayed on a display unit thereof. In this case, a picture having a vertical resolution higher than that of the current broadcasting television system can be obtained.

Furthermore, recently, in order to increase the quality of image in addition to widening the picture, video software is recorded, edited or stored in a form of component signals. Thus using the component signals in locations of broadcasting stations is being developed. In this case, in a location of a broadcasting station such as a main adjusting room from which a video signal is transmitted to a television transmission station, the video signal is used in a form of the progressive scanning component signals, and then the progressive scanning component signal is converted into an interlaced scanning letter box signal, which is then transmitted to the television transmission station.

However, almost all the units or apparatuses in the broadcasting stations such as currently used cameras, VTRs, switching units, transmission units and the like are for interlaced scanning signals, and therefore, these units can not process any progressive scanning signal. In order to solve the above-mentioned problems, the following conventional proposed system for processing a progressive scanning signal is disclosed in Akihiko HORI et al., "Component studio system for EDTV", ITE Technical Report, Vol. 17, No. 7, pp. 7–12, BCS'93-2, BFO, in January 1993.

In the conventional proposed system, a progressive scanning signal composed of a luminance signal and two color difference signals is converted into an interlaced scanning signal, so that the luminance signal is divided into a main signal and a sub-signal every one horizontal scanning line so as to be expanded in a time domain of the interlaced scanning system and to be simultaneously outputted in synchronous with each other, so that the two progressive scanning color difference signals are converted into two interlaced scanning signals, respectively, through progressive to interlaced signal conversion. After the progressive scanning signal is thus converted into the interlaced scanning component signals as mentioned above, respective processes are performed on the interlaced scanning component signals within the broadcasting station, and thereafter, the processed interlaced scanning component signals are converted into the progressive scanning signal prior to conversion to the letter box signal.

That is, in the conventional proposed system, the progressive scanning luminance signal is divided into the main signal and the sub-signal every one horizontal scanning line so as to be expanded in a time domain of the progressive scanning system and to be simultaneously outputted in synchronous with each other. This converting method will be described below in detail with reference to FIGS. 10A to 10F, wherein FIG. 10A shows respective scanning lines of an input progressive scanning signal in blanking intervals and effective intervals;

FIG. 10B shows respective scanning lines of a main signal after progressive to interlaced signal conversion in blanking intervals and effective intervals;

FIG. 10C shows respective scanning lines of a sub-signal after progressive to interlaced signal conversion in blanking intervals and effective intervals;

FIG. 10D shows respective scanning lines of a main signal after interlaced to progressive signal conversion in blanking intervals and effective intervals;

FIG. 10E shows respective scanning lines of a sub-signal after interlaced to progressive signal conversion in blanking intervals and effective intervals; and FIG. 10F shows respective scanning lines of a combined progressive scanning signal in blanking intervals and effective intervals.

In FIGS. 10A to 10F, respective numbers denote numbers of horizontal scanning lines of the input progressive scanning signal. The incline of respective horizontal scanning lines corresponds to a time interval of horizontal scanning.

In the progressive to interlaced signal conversion shown in FIGS. 10A to 10F, when the horizontal scanning lines of the progressive scanning signal are numbered in an order of 1, 2, 3, ... from the top line of the blanking interval as shown in FIG. 10A, the top line of the blanking interval of the main signal is numbered as one, whereas the top line of the blanking interval of the sub-signal is numbered as two. Therefore, in the case of the interlaced scanning signal, since an equalizing pulse for a synchronizing signal is added to the top line of the blanking interval, the 525-th line of the first field of the main signal is also over the blanking interval as shown in 900 of FIG. 10B. Accordingly, even though the main signal is combined to the sub-signal and then is converted into the progressive scanning signal as shown in FIGS. 10D and 10E, the resulting progressive scanning signal loses half the information of the 525-th horizontal scanning line as shown in 902 of FIG. 10F. In other words, there is such a problem that the signal of the 525-th horizontal scanning line of the main signal which has been converted into the interlaced scanning signal can not be used upon processing the interlaced scanning signal.

As mentioned above, the information of the 525-th horizontal scanning line which can be utilized as video signal information is lost depending on the converting method in the case of NTSC system.

SUMMARY OF THE INVENTION

The object of the present invention is therefore to provide an apparatus for processing a progressive scanning signal, capable of converting a progressive scanning signal into an interlaced scanning signal comprising a main signal and a sub-signal which are simultaneously outputted in synchronous with each other, without losing the information of all the effective horizontal scanning lines of the progressive scanning signal.

Another object of the present invention is to provide an apparatus for further processing a progressive scanning signal, capable of minimizing a shift of the position in the vertical direction among a picture of an original progressive scanning signal displayed on a display unit, a picture of an interlaced scanning signal converted from the original progressive scanning signal which is displayed on the displayed unit, and a picture of the progressive scanning signal after processing and reproducing the same which is displayed on a display unit.

In order to achieve the aforementioned objective, according to one aspect of the present invention, there is provided an apparatus for processing a progressive scanning video signal, comprising a progressive to interlaced signal converter for converting an input progressive scanning video signal into an interlaced scanning video signal including a main signal and a sub-signal, wherein said progressive to interlaced signal converter comprises:

first switch means for switching said input progressive scanning video signal alternately every one horizontal scanning line of progressive scanning so as to be divided into a main original signal and a sub-original signal;

first time expanding means for expanding a time interval of said main original signal outputted from said first switch means so as to convert said main original signal into a main signal having a period of horizontal scanning of interlaced scanning;

second time expanding means for expanding a time interval of said sub-original signal outputted from said first switch means so as to convert said sub-original signal into a sub-signal having the period of the horizontal scanning of the interlaced scanning; and first synchronizing means for performing a synchronizing process on said main signal outputted from said first time expanding means and said sub-signal outputted from said second time expanding means so as to output an interlaced scanning signal including said main signal and said sub-signal in synchronous with each other, and so that said main signal and said sub-signal start respectively from a pair of two horizontal lines which is continuously inputted after the first horizontal scanning line of the input progressive scanning video signal.

In the above-mentioned apparatus, said pair of two horizontal lines which is continuously inputted after the first horizontal scanning line of the input progressive scanning video signal is preferably the second horizontal scanning line and the third horizontal scanning line.

In the above-mentioned apparatus, said pair of two horizontal lines which is continuously inputted after the first horizontal scanning line of the input progressive scanning video signal is preferably the third horizontal scanning line and the fourth horizontal scanning line.

According to another aspect of the present invention, there is provided an apparatus for processing a progressive scanning video signal, comprising an interlaced to progressive signal converter for converting an input interlaced scanning video signal including a main signal and a sub-signal into a progressive scanning video signal, wherein said interlaced to progressive signal converter comprises:

first time compression means for expanding a time interval of said main signal of said input interlaced scanning video signal so as to convert said main signal into a main signal having a period of horizontal scanning of progressive scanning;

second time compression means for expanding a time interval of said sub-signal of said input interlaced scanning video signal so as to convert said sub-signal into a sub-signal having the period of horizontal scanning of the progressive scanning;

second switch means for switching said main signal and said sub-signal respectively outputted from said first and second time compression means alternately every one horizontal scanning line of the progressive scanning to combine said main signal and said sub-signal so as to generate a progressive scanning video signal composed of said main signal and said sub-signal; and second synchronizing means for performing a blanking process on said progressive scanning video signal outputted from said second switch means based on input synchronizing signals for the progressive scanning by delaying said input synchronizing signals by a predetermined time interval so that an arrangement of the horizontal scanning lines of said progressive scanning video signal to be outputted becomes the same as that of an original progressive scanning video signal of said input interlaced scanning video signal, and for outputting a progressive scanning video signal on which said blanking process has been performed.

In the above-mentioned apparatus, said time interval is preferably a time interval of three horizontal scanning lines of the progressive scanning.

According to a further aspect of the present invention, there is provided an apparatus for processing a progressive scanning video signal, comprising a progressive to interlaced signal converter for converting an input progressive scanning video signal into an interlaced scanning video signal including a main signal and a sub-signal, and an interlaced to progressive signal converter for converting an input interlaced scanning video signal including a main signal and a sub-signal into a progressive scanning video signal, wherein said progressive to interlaced signal converter comprises:

first switch means for switching said input progressive scanning video signal alternately every one horizontal scanning line of progressive scanning so as to be divided into a main original signal and a sub-original signal;

first time expanding means for expanding a time interval of said main original signal outputted from said first switch means so as to convert said main original signal into a main signal having a period of horizontal scanning of interlaced scanning;

second time expanding means for expanding a time interval of said sub-original signal outputted from said first switch means so as to convert said sub-original signal into a sub-signal having the period of the horizontal scanning of the interlaced scanning; and first synchronizing means for performing a synchronizing process on said main signal outputted from said first time expanding means and said sub-signal outputted from said second time expanding means so as to output an interlaced scanning signal including said main signal and said sub-signal in synchronous with each other, and so that said main signal and said sub-signal start respectively from a pair of continuing two horizontal lines after the first horizontal scanning line of the input progressive scanning video signal;

wherein said interlaced to progressive signal converter comprises:

first time compression means for expanding a time interval of said main signal of said input interlaced scanning video signal so as to convert said main signal into a main signal having a period of horizontal scanning of the progressive scanning;

second time compression means for expanding a time interval of said sub-signal of said input interlaced scanning video signal so as to convert said sub-signal into a sub-signal having the period of horizontal scanning of the progressive scanning;

second switch means for switching said main signal and said sub-signal respectively outputted from said first and second time compression means alternately every one horizontal scanning line of the progressive scanning to combine said main signal and said sub-signal so as to generate a progressive scanning video signal composed of said main signal and said sub-signal; and second synchronizing means for performing a blanking process on said progressive scanning video signal outputted from said second switch means based on input synchronizing signals for the progressive scanning by delaying said input synchronizing signals by a predetermined time interval so that an arrangement of the horizontal scanning lines of said progressive scanning video signal to be outputted becomes the same as that of an original progressive scanning video signal of said input interlaced scanning video signal, and for outputting a progressive scanning video signal on which said blanking process has been performed.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2B is a schematic diagram showing respective scanning lines of a main signal S1 in blanking intervals and effective intervals in the system shown in FIG. 1;

FIG. 2C is a schematic diagram showing respective scanning lines of a sub-signal S2 in blanking intervals and effective intervals in the system shown in FIG. 1;

FIG. 2D is a schematic diagram showing respective scanning lines of a main signal Sic in blanking intervals and effective intervals in the system shown in FIG. 1;

FIG. 2E is a schematic diagram showing respective scanning lines of a sub-signal S2c in blanking intervals and effective intervals in the system shown in FIG. 1;

FIG. 4 is a timing chart showing an operation of the progressive to interlaced signal converter 2 shown in FIG. 3;

FIG. 5A is a schematic diagram showing respective scanning lines of a combined progressive scanning signal S3' in blanking intervals and effective intervals in the system of the first preferred embodiment shown in FIG. 1;

FIG. 5B is a schematic diagram showing respective scanning lines of a combined progressive scanning signal S3 in blanking intervals and effective intervals in a system for processing a progressive scanning signal according to a second preferred embodiment of the present invention;

FIG. 6 is a schematic block diagram of an interlaced to progressive signal converter 5 used in the system of the second preferred embodiment;

FIG. 8 is a schematic block diagram of a synchronizing signal processing circuit 12 shown in FIG. 3;

FIG. 9 is a schematic block diagram of a synchronizing signal processing circuit 18 shown in FIG. 6;

FIG. 10B is a schematic diagram showing respective scanning lines of a main signal after progressive to interlaced signal conversion in blanking intervals and effective intervals in the conventional proposed system for processing the progressive scanning signal;

FIG. 10C is a schematic diagram showing respective scanning lines of a sub-signal after progressive to interlaced signal conversion in blanking intervals and effective intervals in the conventional proposed system for processing the progressive scanning signal;

FIG. 10D is a schematic diagram showing respective scanning lines of a main signal after interlaced to progressive signal conversion in blanking intervals and effective intervals in the conventional proposed system for processing the progressive scanning signal;

FIG. 10E is a schematic diagram showing respective scanning lines of a sub-signal after interlaced to progressive signal conversion in blanking intervals and effective intervals in the conventional proposed system for processing the progressive scanning signal.

DETAILED DESCRIPTION OF THE PREFERRED EMBODIMENTS

The preferred embodiments according to the present invention will be described below with reference to the attached drawings. In the preferred embodiments, a video signal of the NTSC System is used as a progressive scanning signal and an interlaced scanning signal. Further, a horizontal scanning line is referred to as a line hereinafter, and for example, the first horizontal scanning line is referred to as the first line hereinafter.

FIRST PREFERRED EMBODIMENT

Figure 1:
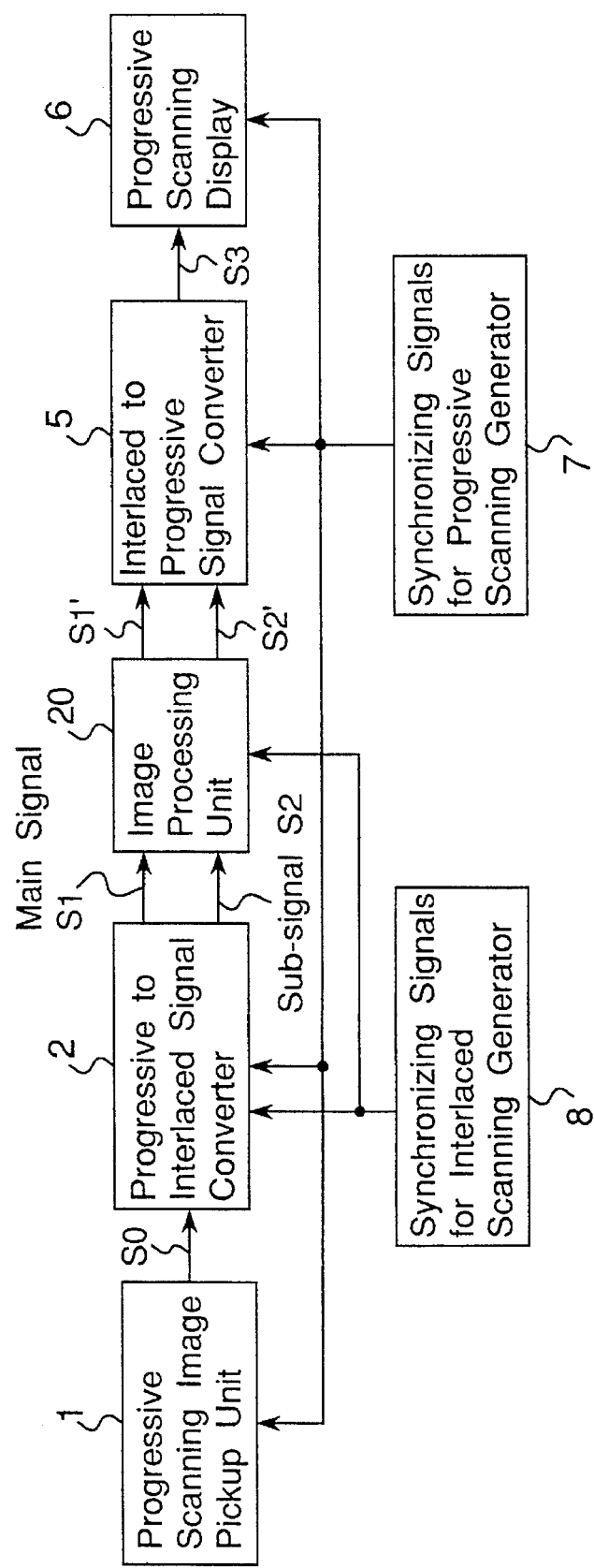
FIG. 1 is a schematic block diagram of a system for processing a progressive scanning signal, according to a first preferred embodiment of the present invention.

FIG. 1 shows a system for processing a progressive scanning signal (referred to as a processing system hereinafter), according to a preferred embodiment of the present invention.

Referring to FIG. 1, the processing system of the preferred embodiment comprises a progressive scanning image pickup unit 1, a progressive to interlaced signal converter 2, an image processing unit 20, an interlaced to progressive signal converter 5, a progressive scanning display unit 6, a synchronizing signals for interlaced scanning generator 8, and a synchronizing signals for progressive scanning generator 7. It is to be noted that the image processing unit 20 is a VTR, a switching unit, a transmission unit or the like which are provided in a broadcasting station, or a system including these units. In the following preferred embodiment, the component signals are handled, and a main signal S1 and a sub-signal S2 are luminance signals. Color difference signals are processed in circuits similar to those shown in FIG. 1, and therefore, the description of the circuits thereof is omitted in the specification.

Referring to FIG. 1, the progressive scanning image pickup unit 1 is provided as a source of a progressive scanning signal S0, and generates and outputs the progressive scanning signal S0 to the progressive to interlaced signal converter 2. The progressive to interlaced signal converter 2 converts the progressive scanning signal sent from the progressive scanning image pickup unit 1, into an interlaced scanning signal including a main signal S1 and a sub-signal S2, which are transmitted to the image processing unit 20. A processed interlaced scanning signal including a main signal S1' and a sub-signal S2' are transmitted from the image processing unit 20 to the interlaced to progressive signal converter 5, which then converts the processed interlaced scanning signal including the main signal S1' and the sub-signal S2' into a progressive scanning signal S3. The progressive scanning signal S3 is inputted to the progressive scanning display unit 6, and a picture of the progressive scanning signal S3 is displayed thereon.

The synchronizing signals for interlaced scanning generator 8 (referred to as a generator 8 hereinafter) generates synchronizing signals including a horizontal synchronizing signal HDi, a vertical synchronizing signal VDi, and a blanking signal BLKi which are for interlaced scanning, and then outputs these synchronizing signals to the progressive to interlaced signal converter 2 and the image processing unit 20. Further, the synchronizing signals for progressive scanning generator 7 (referred to as a generator 7 hereinafter) generates synchronizing signals including a horizontal synchronizing signal HD, a vertical synchronizing signal VD, and a blanking signal BLK which are for progressive scanning, and then outputs these synchronizing signals to the progressive scanning image pickup unit 1, the progressive to interlaced signal converter 2, the interlaced to progressive signal converter 5, and the progressive scanning display unit 6.

Figure 2A:
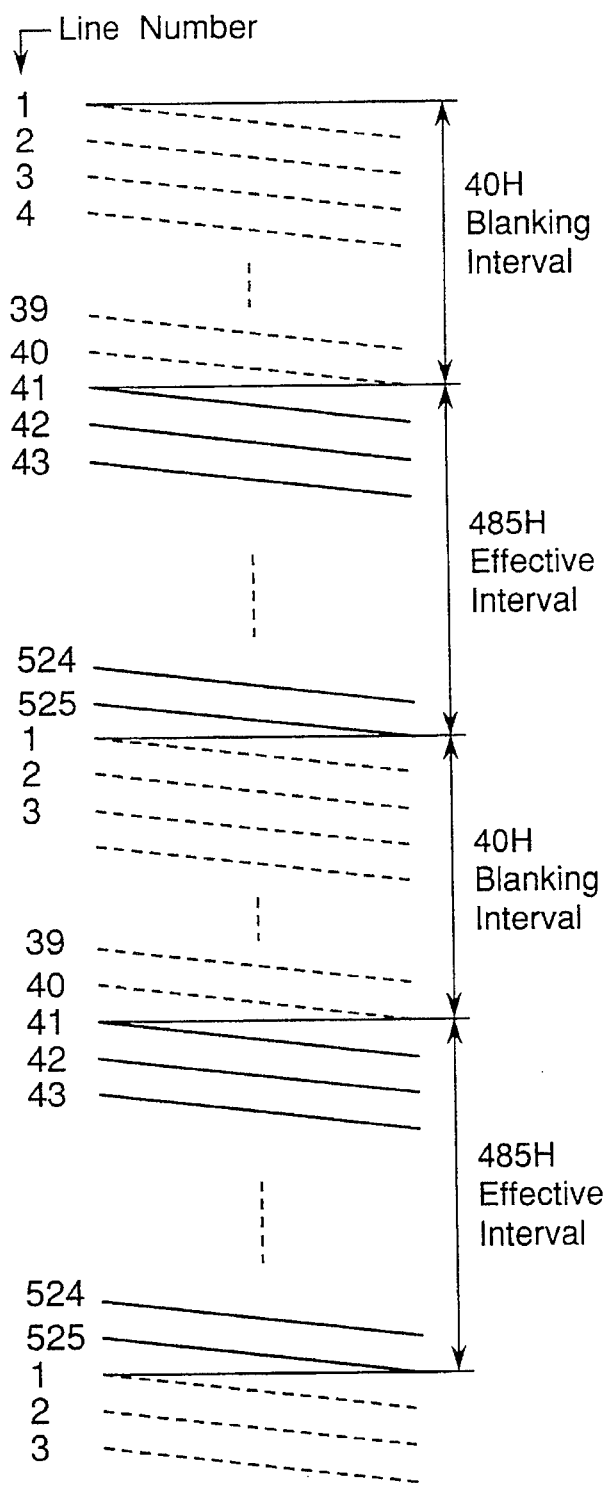
FIG. 2A is a schematic diagram showing respective scanning lines of an input progressive scanning signal S0 in blanking intervals and effective intervals in the system shown in FIG. 1.
Figure 2F:
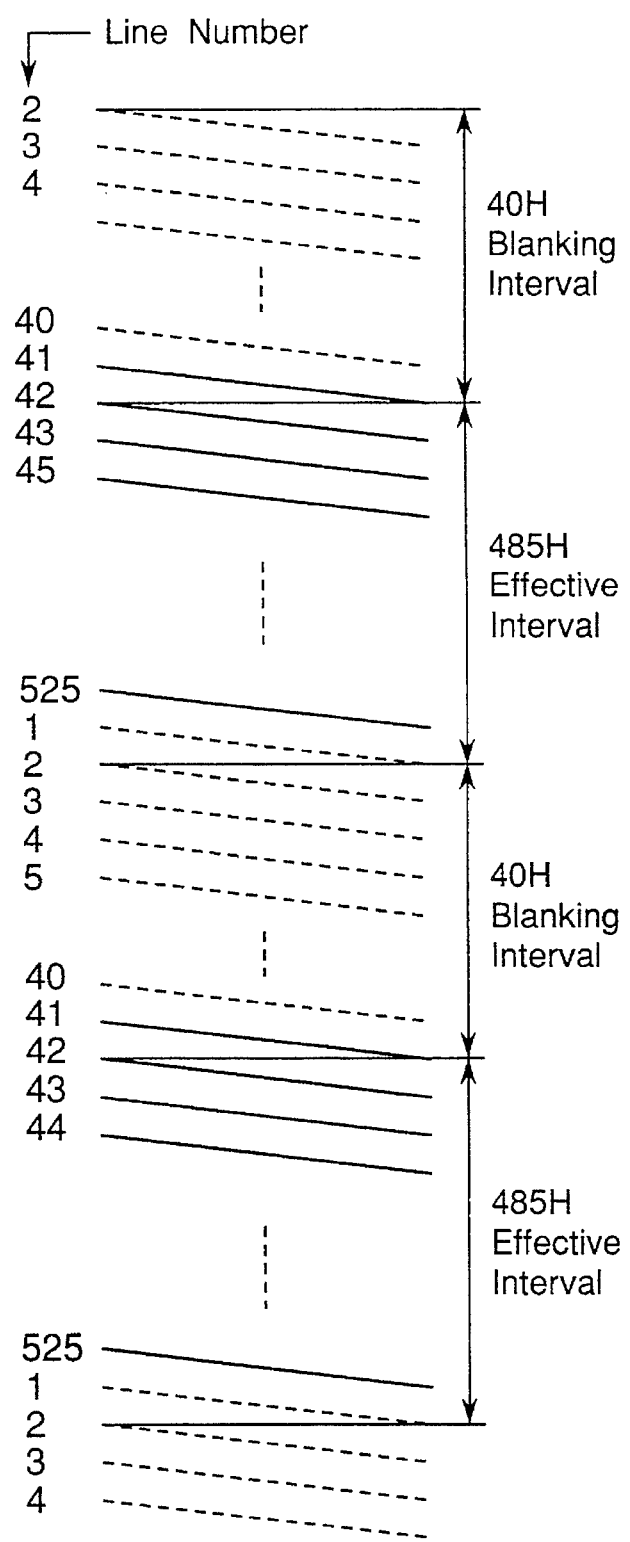
FIG. 2F is a schematic diagram showing respective scanning lines of a combined progressive scanning signal S3' in blanking intervals and effective intervals in the system shown in FIG. 1.

FIGS. 2A to 2F show schematic diagrams of horizontal scanning lines corresponding to FIGS. 10A to 10F, wherein FIG. 2A shows respective scanning lines of an input progressive scanning signal S0 in blanking intervals and effective intervals;

FIG. 2B shows respective scanning lines of a main signal S1 in blanking intervals and effective intervals;

FIG. 2C shows respective scanning lines of a sub-signal S2 in blanking intervals and effective intervals;

FIG. 2D shows respective scanning lines of a main signal S1c in blanking intervals and effective intervals which is outputted from a time compression circuit for main signal of the interlaced to progressive signal converter 5;

FIG. 2E shows respective scanning lines of a sub-signal S2c in blanking intervals and effective intervals which is outputted from a time compression circuit for sub-signal of the interlaced to progressive signal converter 5; and FIG. 2F shows respective scanning lines of a combined progressive scanning signal S3' in blanking intervals and effective intervals.

In FIGS. 2A to 2F, respective numbers denote numbers of horizontal scanning lines of the input progressive scanning signal. The incline of respective horizontal scanning lines corresponds to a time interval of horizontal scanning.

Figure 3:
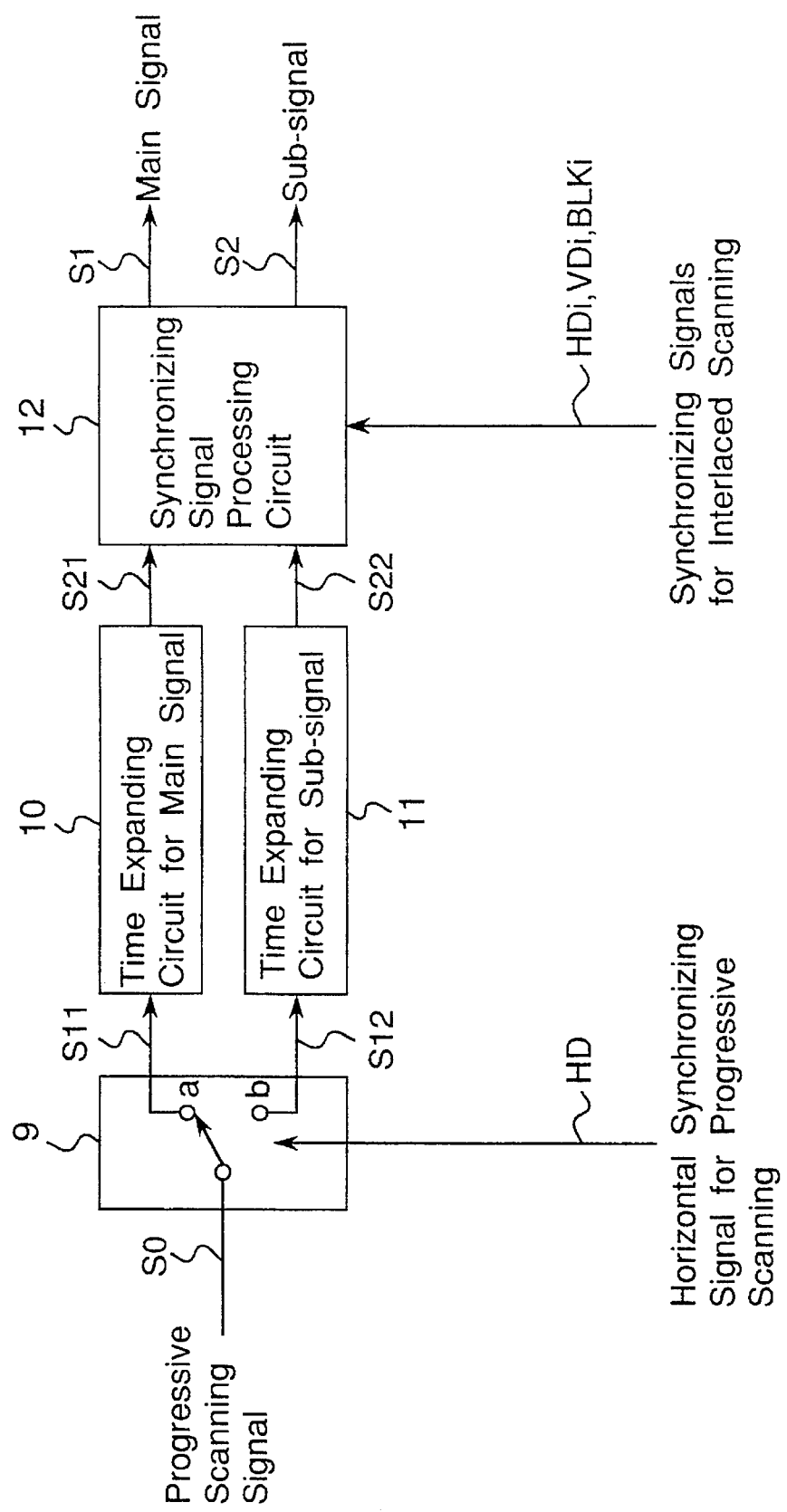
FIG. 3 is a schematic block diagram of a progressive to interlaced signal converter 2 shown in FIG. 1.

FIG. 3 shows the progressive to interlaced signal converter 2 shown in FIG. 1.

Referring to FIG. 3, the progressive to interlaced signal converter 2 comprises a switch 9, a time expanding circuit for main signal 10, a time expanding circuit for sub-signal 11, a synchronizing signal processing circuit 12.

Based on the horizontal synchronizing signal HD sent from the generator 7, the switch 9 is switched over between a contact "a" and a contact "b", alternately, every one horizontal scanning line of the progressive scanning so that the input progressive scanning signal is divided into a main original signal S11 and a sub-original signal S12 through time division of each horizontal scanning line, and then the main original signal S11 is inputted to the time expanding circuit 10 whereas the sub-original signal S12 is inputted to the time expanding circuit 11.

The time expanding circuit 10 comprises a delay circuit, a memory and a memory controller, and delays the main original signal S11 by a time interval of one horizontal scanning line of the progressive scanning and expands the time period of the delayed main original signal S11 so as to generate a time-expanded main signal S21 having twice the time interval per one horizontal scanning line, i.e., having twice the period of the horizontal scanning of the progressive scanning. The time-expanded main signal S21 is outputted to the synchronizing signal processing circuit 12.

On the other hand, the time expanding circuit 11 comprises a memory and a memory controller, and expands the time interval of the delayed sub-original signal S12 so as to generate a time-expanded sub-signal S22 having twice the time interval per one horizontal scanning line, i.e., having twice the period of the horizontal scanning of the progressive scanning. The time-expanded sub-signal S22 is outputted to the synchronizing signal processing circuit 12.

Further, the synchronizing signal processing circuit 12 performs a synchronizing process, a blanking process and a synchronizing adding process, by changing the output timing of the main signal S1 and the sub-signal S2 in synchronous with the synchronizing signals HDi, VDi and BLKi for interlaced scanning, based on the main signal S21 and the sub-signal S22, as described later in detail.

FIG. 8 shows the synchronizing signal processing circuit 12 shown in FIG. 3. Referring to FIG. 8, the synchronizing signal processing circuit 12 comprises delay circuits 100 and 101, a blanking gate circuit 102, and a synchronizing signal adding circuit 103.

The delay circuit 100 delays the sub-signal S22 by twice the time interval of one horizontal scanning line of the progressive scanning, and outputs the delayed sub-signal S22 to the blanking gate circuit 102. Further, the delay circuit 101 delays the synchronizing signals HDi, VDi and BLKi for interlaced scanning by three times the time interval of one horizontal scanning line of the progressive scanning, and outputs the delayed synchronizing signals HDic, VDic and BLKic to the blanking gate circuit 102 and the synchronizing signal adding circuit 103.

The blanking gate circuit 102 performs a blanking process for interlaced scanning on the main signal S21 and the delayed sub-signal S22 based on the delayed blanking signal BLKic, and outputs the processed main signal and the processed sub-signal to the synchronizing signal adding circuit 103. Thereafter, the synchronizing signal adding circuit 103 adds the delayed horizontal synchronizing signal HDic and the delayed vertical synchronizing signal VDic to the main signal and the sub-signal, and then outputs the main signal S1 and the sub-signal S2 together with the synchronizing signals HDic and VDic for interlaced scanning.

In the present preferred embodiment, the blanking gate circuit 102 is provided as shown in FIG. 8, however, the blanking gate circuit 102 is not provided when the blanking process has been performed on the progressive scanning signal S0 in the progressive scanning image pickup unit 1.

FIG. 4 is a timing chart of signals HD, S0, S11, S12, S21, S22, S1, S2, BLKi and BLKic, showing an operation of the progressive to interlaced signal converter 2 shown in FIG. 3. It is to be noted that any blanking signal, any synchronizing signal and the like are not shown in the signals S1 and S2 of FIG. 4. An operation of the processing system of the first preferred embodiment of the present invention will be described below with reference to FIGS. 1, 2A to 2F, 3 and 4.

Referring to FIG. 1, the progressive scanning signal S0 generated by the progressive scanning image pickup unit 1 is processed and outputted based on the synchronizing signals for the progressive scanning generated by the generator 7, so that the blanking interval is from the first line to the 40-th line and the effective interval is from the 41-st line to 525-th line, as shown in FIG. 2A. In the present preferred embodiment, the blanking interval is set to 40 horizontal scanning lines.

Further, the progressive to interlaced signal converter 2 converts the input progressive scanning signal S0 shown in FIG. 2A, into the main signal S1 shown in FIG. 2B and the sub-signal S2 shown in FIG. 2C. In this converting process, the difference between the present preferred embodiment and the conventional system is as follows. In any field, the third line of the progressive scanning signal S0 is set to the top or start line of the blanking interval of the main signal S1 as shown in FIGS. 2B and 4, and further, the main signal S1 includes the 5-th line signal, the 7-th line signal, the 9-th line signal, and the like. On the other hand, the second line of the progressive scanning signal S0 is set to the top or start line of the blanking interval of the sub-signal S2, and further, the sub-signal S2 includes the 4-th line signal, the 6-th line signal, the 8-th line signal and the like.

The above-mentioned operation will be described in detail with reference to FIGS. 3 and 4.

Referring to FIG. 3, in the progressive to interlaced signal converter 2, the input progressive scanning signal S0 shown in FIG. 4 is switched over between the contacts "a" and "b" alternately every one horizontal scanning line of the progressive scanning by the switch 9 according to the horizontal synchronizing signal HD, so as to be divided into the main original signal S11 and the sub-original signal S12 shown in FIG. 4. In the signals S11 and S12 shown in FIG. 4, X denotes no output signal. The signals S11 and S12 are time-expanded by the time expanding circuits 10 and 11 so as to be converted into the signals S21 and S22 each having twice the time interval of one horizontal scanning line per one line signal of one horizontal scanning line of the progressive scanning signal S0, i.e., having twice the period of the horizontal scanning of the progressive scanning, as shown in FIG. 4, after delaying the main original signal S11 by the time interval of one horizontal scanning line of the progressive scanning.

Further, in the synchronizing signal processing circuit 12, only the sub-signal S22 is delayed by a time interval of one horizontal scanning line of the interlaced scanning, and also the vertical blanking signal BLKi for interlaced scanning shown by a real line of FIG. 4 is delayed by a time interval of three horizontal scanning lines of the progressive scanning so as to be converted into the delayed vertical blanking signal BLKic shown by a dotted line of FIG. 4. In this case, the signals S21 and S22 are converted into the signals S1 and S2, as shown in FIG. 4. This results in the signals S1 and S2 shown in FIGS. 2B and 2C, respectively, having appropriate output timings. In this case, the 525-th line of the main signal S1 does not enter the blanking interval. That is, the last line of the main signal S1 within the effective interval becomes the 525-th line as shown in FIG. 2B, and the last line of the sub-signal S2 within the effective interval becomes the 524-th line as shown in FIG. 2C.

In the following next field, due to a relationship of the interlaced scannings, the main signal S1 which included the odd horizontal scanning line numbers in the previous field includes the even horizontal scanning line numbers, whereas the sub-signal S2 which included the even horizontal scanning line numbers in the previous field includes the odd horizontal scanning line numbers. Further, the start position of the vertical blanking of the main signal S1 is located in the center of the second line as shown in FIG. 2B, whereas the start position of the vertical blanking of the sub-signal S2 is located in the center of the first line as shown in FIG. 2C. However, the 525-th line of the sub-signal S2 does not enter the blanking interval in a manner similar to that of the previous field.

It is to be noted that, as shown in FIG. 1, the synchronizing signals for progressive scanning generator 7 generates and outputs the synchronizing signals for progressive scanning to the progressive scanning image pickup unit 1, the progressive to interlaced signal converter 2, the interlaced to progressive signal converter 5 and the progressive scanning display unit 6, and further the synchronizing signals for interlaced scanning generator 8 generates and outputs the synchronizing signals to the progressive to interlaced signal converter 2 and the image processing unit 20.

Referring back to FIG. 1, the main signal S1 and the sub-signal S2 outputted from the progressive to interlaced signal converter 2 are processed by the image processing unit 20 such as a video camera, a VTR, an video editing unit, a switching unit or the like, and then the processed main signal S1' and the processed sub-signal S2' are inputted to the interlaced to progressive signal converter 5.

The interlaced to progressive signal converter 5 compresses the time intervals of the main signal S1' and the sub-signal S2' as respectively shown in FIGS. 2D and 2E, and then combines the time-compressed signals S1' and S2' to generate a progressive scanning signal S3 having a period of the horizontal scanning of the progressive scanning so that the horizontal scanning lines are arranged in an appropriate order of the horizontal scanning line numbers. Thereafter, the progressive scanning signal S3 outputted from the interlaced to progressive signal converter 5 is inputted to the progressive scanning display unit 6, which displays an image of the progressive scanning signal S3 thereon.

As mentioned above, according to the first preferred embodiment of the present invention, the progressive to interlaced signal converter 2 converts the input progressive scanning signal S0 into the main signal S1 and the sub-signal S2 so that the main signal S1 starts from the third line on the start line of the blanking interval and the sub-signal S2 starts from the second line on the start line of the blanking interval. Therefore, the interlaced signal including the main signal S1 and sub-signal S2 can be processed by the image processing unit 20 without losing any information of the 525-th line within the effective interval.

In the above-mentioned first preferred embodiment, the third line and the second line are selected respectively as the start lines of the main signal S1 and the sub-signal S2 of any field, however, the present invention is not limited to this. The other pair of sequentially continuous two horizontal scanning lines, which do not include the first line, such as the fourth line and the fifth line, the fifth line and the sixth line, the sixth line and the seventh line or the like, may be selected as the start lines of the main signal S1 and the sub-signal S2 of any field so as not to cause any inconvenience upon processing the signals. In other words, the line numbers of the main signal S1 is replaced with the line numbers of the sub-signal S2 among the other above-mentioned pair of continuous two horizontal scanning lines which do not include the first line.

The color difference signals are processed by the progressive to interlaced signal converter 2 in a manner similar to that of above, or may be processed in the following manners. In the progressive to interlaced signal converter 2 for converting the input progressive scanning signal into the interlaced scanning signal, an appropriate filtering process is performed on the color difference signals, and then the time intervals of the processed color difference signals are expanded to the time interval of the interlaced scanning, further being thinned out in a ratio of 2:1.

In the above-mentioned first preferred embodiment, the progressive scanning image pickup unit 1 is used, however, the other progressive scanning signal source such as a signal generator for generating a progressive scanning signal of a computer graphics may be used.

SECOND PREFERRED EMBODIMENT

Another system for processing a progressive scanning signal according to the second preferred embodiment of the present invention which is provided to solve the following problem or defect of the first preferred embodiment of the present invention will be described below with reference to FIGS. 5A, 5B, 6, 7 and 9.

FIG. 5A shows respective scanning lines of a combined progressive scanning signal S3' in blanking intervals and effective intervals in the system of the first preferred embodiment shown in FIG. 1, and FIG. 5B shows respective scanning lines of a combined progressive scanning signal S3 in blanking intervals and effective intervals in a system for processing a progressive scanning signal according to the second preferred embodiment of the present invention, wherein FIG. 5A is the same as FIG. 2F.

In the first preferred embodiment, as is apparent from FIG. 5A, the progressive scanning signal S3' outputted from the interlaced to progressive signal converter 5 includes the second line starting from the start position of the vertical blanking interval. Therefore, an image of the converted progressive scanning signal is shifted in the vertical direction by one horizontal scanning line of the progressive scanning signal as compared with the original progressive scanning signal outputted from the progressive scanning image pickup unit 1 as is apparent from comparison between FIGS. 2A and 5A. Further, if a switching unit of the image processing unit 20 delays the interlaced scanning signal including the main signal S1 and the sub-signal S2 in a unit of the horizontal scanning line, the image of the converted progressive scanning signal is shifted by two or more horizontal scanning lines of the progressive scanning signal as compared with the original progressive scanning signal outputted from the progressive scanning image pickup unit 1.

In order to solve the above-mentioned problem or defect, the difference between the second and first preferred embodiments is that the delay circuit 19 for delaying the synchronizing signals HD, VD and BLK by three horizontal scanning lines of the progressive scanning signal is provided in the second preferred embodiment, namely, the phase relationship between (a) the synchronizing signals inputted from the synchronizing signal for progressive scanning generator 7 to the interlaced to progressive signal converter 5 and (b) the combined progressive scanning signal S3 outputted from the interlaced to progressive signal converter 5 is set to an appropriate relationship as shown in FIG. 5B so as to obtain the same positional relationship of the progressive scanning signal outputted from the progressive scanning image pickup unit 1. This operation will be described below with reference to FIGS. 6 and 7.

Figure 7:
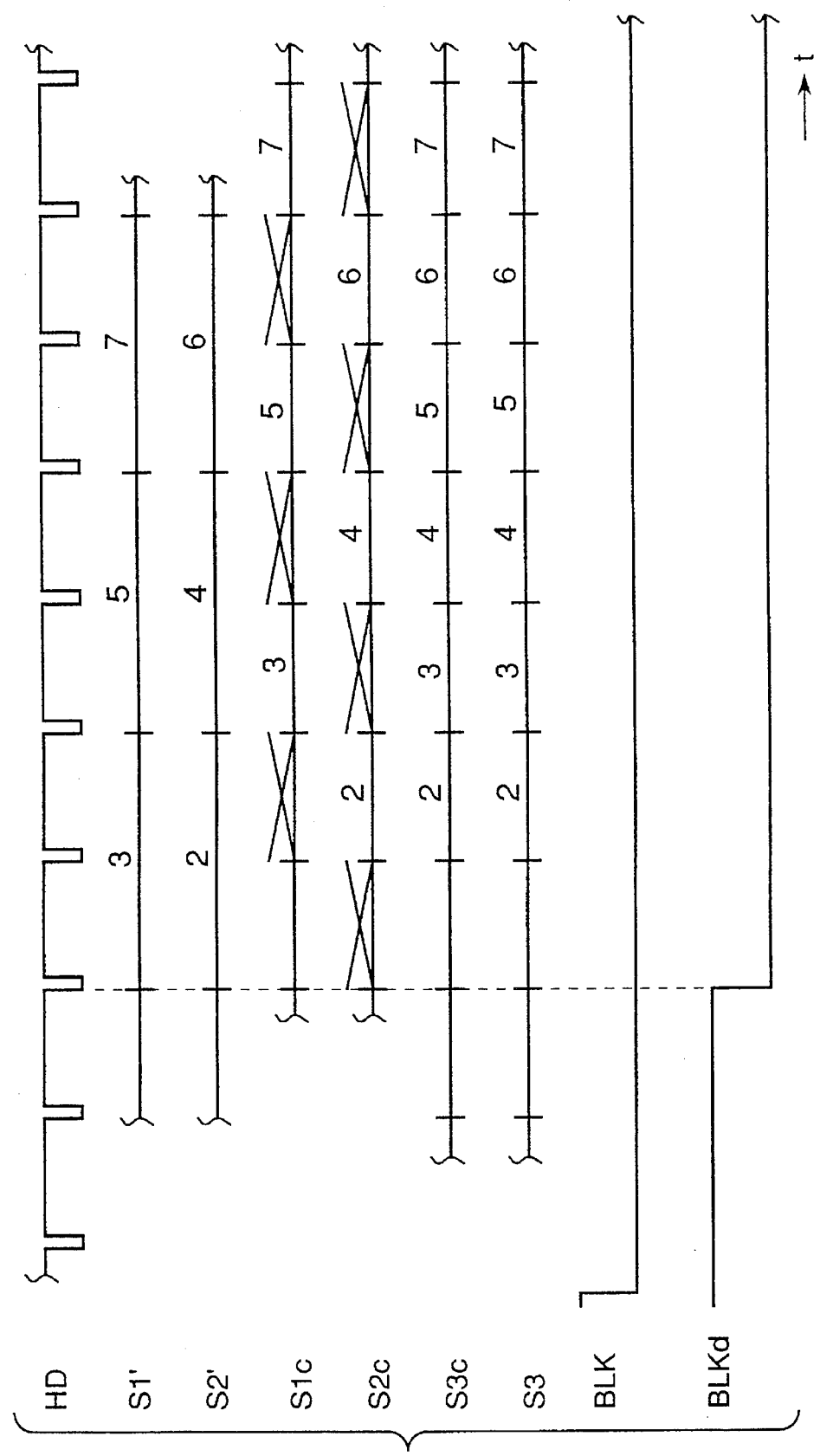
FIG. 7 is a timing chart showing an operation of the interlaced to progressive signal converter 5 shown in FIG. 6.
Figure 10A:
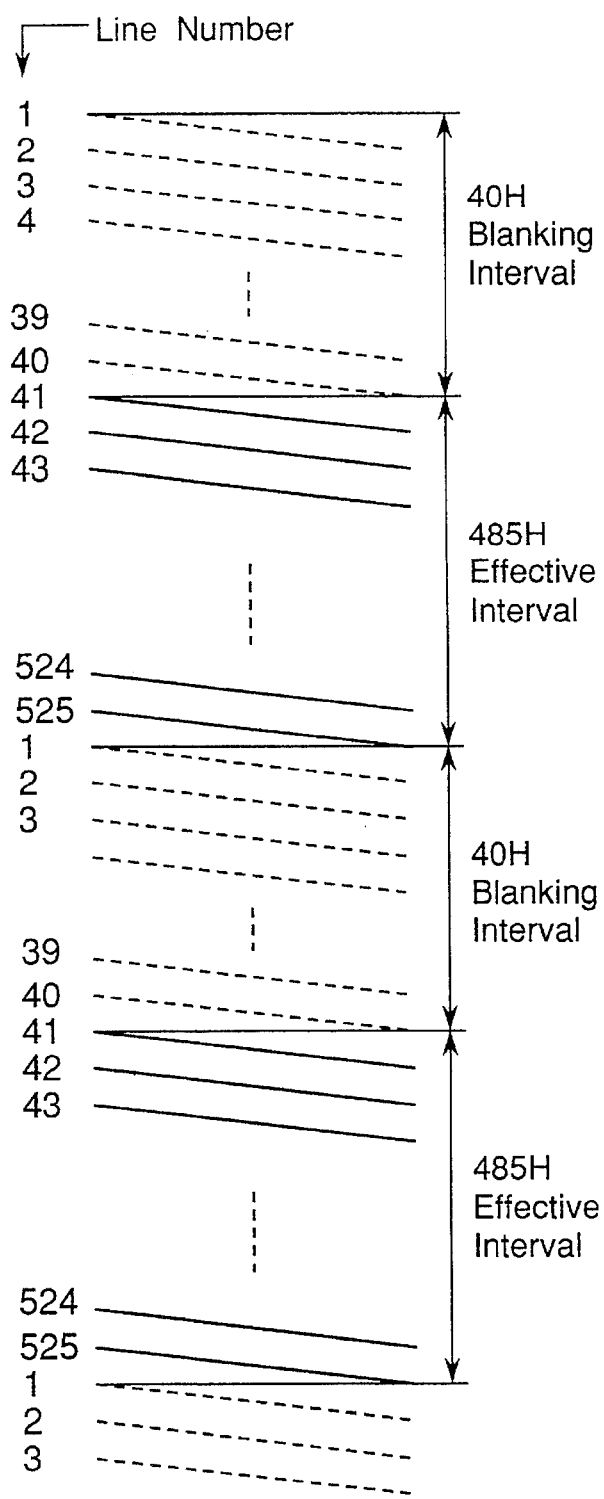
FIG. 10A is a schematic diagram showing respective scanning lines of an input progressive scanning signal in blanking intervals and effective intervals in a conventional proposed system for processing a progressive scanning signal.
Figure 10F:
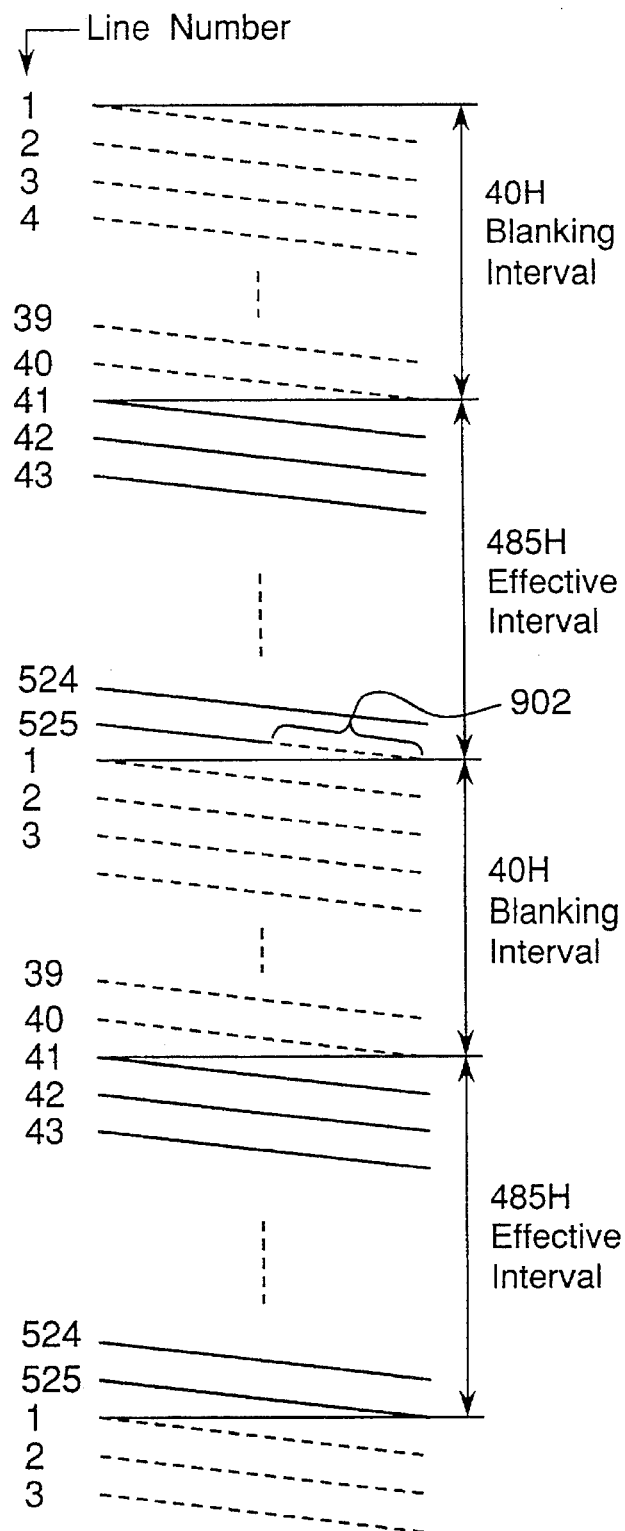
FIG. 10F is a schematic diagram showing respective scanning lines of a combined progressive scanning signal in blanking intervals and effective intervals in the conventional proposed system for processing the progressive scanning signal.

FIG. 6 shows the interlaced to progressive signal converter 5 used in the system of the second preferred embodiment, and FIG. 7 is a timing chart showing an operation of the interlaced to progressive signal converter 5 shown in FIG. 6, and the synchronizing signals such as the vertical and horizontal synchronizing signals, the blanking signal or the like are not shown in the combined signal S3 of FIG. 7.

Referring to FIG. 6, the interlaced to progressive signal converter 5 comprises a time compression circuit for main signal 14, a time compression circuit for sub-signal 15, a switch 16, a delay circuit 19, and a synchronizing signal processing circuit 18.

In the interlaced to progressive signal converter 5, as shown in FIG. 7, the time compression circuit for main signal 14 delays the main signal S1' by two horizontal scanning lines of the progressive scanning and then compresses the time interval of the delayed main signal S1' so as to generate a main signal S1c having a period of the horizontal scanning of the progressive scanning, which is outputted to a contact "a" of the switch 16, whereas the time compression circuit for sub-signal 15 delays the sub-signal S2' by one horizontal scanning line of the progressive scanning and then compresses the time interval of the delayed sub-signal S2' so as to generate a sub-signal S2c having a period of the horizontal scanning of the progressive scanning, which is outputted to a contact "b" of the switch 16. It is to be noted that portions where any line number is not described represent that there is no output signal transmitted from the time compression circuits 14 and 15, namely, X denotes that no output signal is transmitted from the time compression circuits 14 and 15.

Among the synchronizing signals HD, VD and BLK generated by the generator 7, the horizontal synchronizing signal HD for progressive scanning is inputted to a control terminal of the switch 16. Based on the horizontal synchronizing signal HD, the switch 16 is switched over between a contact "a" and a contact "b", alternately, every one horizontal scanning line of the progressive scanning so that the input main signal S1c and the sub-signal S2c are alternately outputted every one horizontal scanning line of the progressive scanning as a progressive scanning signal S3c to the synchronizing signal processing circuit 18, as shown in FIG. 7.

On the other hand, the delay circuit 19 delays the synchronizing signals HD, VD and BLK for progressive scanning by three horizontal scanning lines of the progressive scanning, and outputs the delayed synchronizing signals HDd, VDd and BLKd to the synchronizing signal processing circuit 18. Based on the delayed synchronizing signals HDd, VDd and BLKd inputted from the delay circuit 19, the synchronizing signal processing circuit 18 performs a blanking process, a process for adding the synchronizing signals and the like on the combined progressive scanning signal S3c, so as to obtain a progressive scanning signal S3 shown in FIG. 5B.

It is to be noted that the above-mentioned delay amount of the delay circuit 19 is determined depending on a relationship between the phase of the synchronizing signals HD, VD and BLK for progressive scanning and the phase of the combined progressive scanning signal S3c. In this case, the blanking signal BLK is delayed by three horizontal scanning lines of the progressive scanning so as to obtain the delayed blanking signal BLKd, as shown in FIG. 7.

FIG. 9 shows the synchronizing signal processing circuit 18 shown in FIG. 6. Referring to FIG. 9, the synchronizing signal processing circuit 18 comprises a blanking gate circuit 200 and a synchronizing signal adding circuit 201. Based on the delayed blanking signal BLKd from the delay circuit 19, the blanking gate circuit 200 performs the blanking process on the input combined progressive scanning signal S3c, and then outputs the processed progressive scanning signal to the synchronizing signal adding circuit 201. The synchronizing signal adding circuit 201 adds the synchronizing signals HDd and VDd to the processed progressive scanning signal from the blanking gate circuit 200 and then outputs the progressive scanning signal S3 together with the synchronizing signals HDd and VDd to the progressive scanning display unit 6.

According to the second preferred embodiment of the present invention, the positional relationship of the progressive scanning signal to the synchronizing signal in the input progressive scanning signal S0 outputted from the progressive scanning image pickup unit 1 is made to be the same as that in the output progressive scanning signal S3 outputted from the interlaced to progressive signal converter 5, and then the above-mentioned shift of the image displayed on the progressive scanning display unit 6 can be prevented. In other words, in this case, the second line of the combined progressive scanning signal S3 starts at a timing delayed by one horizontal scanning line of the progressing scanning from the start position of the blanking interval, and then the arrangement of the horizontal scanning lines of the combined progressive scanning signal S3 shown in FIG. 5B becomes the same as that of the input progressive scanning signal S0 shown in FIG. 2A.

It is to be noted that the delay amount of the delay circuit 19 may be set to a value so that a shift of the position of the image in the vertical direction displayed on the progressive scanning display unit 6 due to the difference between the input progressive scanning signal S0 and the output progressive scanning signal S3 becomes a minimum shift so as not to cause any inconvenience.

OTHER EMBODIMENTS

In the above-mentioned preferred embodiments, the video signal of the NTSC system is used, however, a video signal of the other video system such as the PAL system, the SECAM system, the ATV (Advanced Television) system, or the like may be used.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for processing a progressive scanning video signal, comprising a progressive to interlaced signal converter for converting an input progressive scanning video signal into an interlaced scanning video signal including a main signal and a subsignal, wherein said progressive to interlaced signal converter comprises:

first switch means for switching said input progressive scanning video signal alternately every one horizontal scanning line of progressive scanning so as to be divided into a main original signal and a sub-original signal;

first time expanding means for expanding a time interval of said main original signal outputted from said first switch means so as to convert said main original signal into a main signal having a period of horizontal scanning of interlaced scanning;

second time expanding means for expanding a time interval of said sub-original signal outputted from said first switch means so as to convert said sub-original signal into a sub-signal having the period of the horizontal scanning of the interlaced scanning; and first synchronizing means for performing a synchronizing process on said main signal outputted from said first time expanding means and said sub-signal outputted from said second time expanding means so as to output an interlaced scanning signal including said main signal and said sub-signal in synchronous with each other, and so that said main signal and said sub-signal start respectively from a pair of two horizontal lines which is continuously inputted after the first horizontal scanning line of the input progressive scanning video signal.

2. The apparatus as claimed in claim 1, wherein said pair of two horizontal lines which is continuously inputted after the first horizontal scanning line of the input progressive scanning video signal is the second horizontal scanning line and the third horizontal scanning line.

3. The apparatus as claimed in claim 1, wherein said pair of two horizontal lines which is continuously inputted after the first horizontal scanning line of the input progressive scanning video signal is the third horizontal scanning line and the fourth horizontal scanning line.

4. An apparatus for processing a progressive scanning video signal, comprising an interlaced to progressive signal converter for converting an input interlaced scanning video signal including a main signal and a sub-signal into a progressive scanning video signal, wherein said interlaced to progressive signal converter comprises:

first time compression means for expanding a time interval of said main signal of said input interlaced scanning video signal so as to convert said main signal into a main signal having a period of horizontal scanning of progressive scanning;

second time compression means for expanding a time interval of said sub-signal of said input interlaced scanning video signal so as to convert said sub-signal into a sub-signal having the period of horizontal scanning of the progressive scanning;

switch means for switching said main signal and said sub-signal respectively outputted from said first and second time compression means alternately every one horizontal scanning line of the progressive scanning to combine said main signal and said sub-signal so as to generate a progressive scanning video signal composed of said main signal and said sub-signal; and second synchronizing means for performing a blanking process on said progressive scanning video signal outputted from said switch means based on input synchronizing signals for the progressive scanning by delaying said input synchronizing signals by a predetermined time interval so that an arrangement of the horizontal scanning lines of said progressive scanning video signal to be outputted becomes the same as that of an original progressive scanning video signal of said input interlaced scanning video signal, and for outputting a progressive scanning video signal on which said blanking process has been performed.

5. The apparatus as claimed in claim 4, wherein said time interval is a time interval of three horizontal scanning lines of the progressive scanning.

6. An apparatus for processing a progressive scanning video signal, comprising a progressive to interlaced signal converter for converting an input progressive scanning video signal into an interlaced scanning video signal including a main signal and a subsignal, and an interlaced to progressive signal converter for converting an input interlaced scanning video signal including a main signal and a sub-signal into a progressive scanning video signal, wherein said progressive to interlaced signal converter comprises:

first switch means for switching said input progressive scanning video signal alternately every one horizontal scanning line of progressive scanning so as to be divided into a main original signal and a sub-original signal;

first time expanding means for expanding a time interval of said main original signal outputted from said first switch means so as to convert said main original signal into a main signal having a period of horizontal scanning of interlaced scanning;

second time expanding means for expanding a time interval of said sub-original signal outputted from said first switch means so as to convert said sub-original signal into a sub-signal having the period of the horizontal scanning of the interlaced scanning; and first synchronizing means for performing a synchronizing process on said main signal outputted from said first time expanding means and said sub-signal outputted from said second time expanding means so as to output an interlaced scanning signal including said main signal and said sub-signal in synchronous with each other, and so that said main signal and said sub-signal start respectively from a pair of two horizontal lines which is continuously inputted after the first horizontal scanning line of the input progressive scanning video signal;

wherein said interlaced to progressive signal converter comprises:

first time compression means for expanding a time interval of said main signal of said input interlaced scanning video signal so as to convert said main signal into a main signal having a period of horizontal scanning of the progressive scanning;

second time compression means for expanding a time interval of said sub-signal of said input interlaced scanning video signal so as to convert said sub-signal into a sub-signal having the period of horizontal scanning of the progressive scanning;

second switch means for switching said main signal and said sub-signal respectively outputted from said first and second time compression means alternately every one horizontal scanning line of the progressive scanning to combine said main signal and said sub-signal so as to generate a progressive scanning video signal composed of said main signal and said sub-signal; and second synchronizing means for performing a blanking process on said progressive scanning video signal outputted from said second switch means based on input synchronizing signals for the progressive scanning by delaying said input synchronizing signals by a predetermined time interval so that an arrangement of the horizontal scanning lines of said progressive scanning video signal to be outputted becomes the same as that of an original progressive scanning video signal of said input interlaced scanning video signal, and for outputting a progressive scanning video signal on which said blanking process has been performed.

7. The apparatus as claimed in claim 6, wherein said pair of two horizontal lines which is continuously inputted after the first horizontal scanning line of the input progressive scanning video signal is the second horizontal scanning line and the third horizontal scanning line.

8. The apparatus as claimed in claim 6,
wherein said pair of two horizontal lines which is continuously inputted after the first horizontal scanning line of the input progressive scanning video signal is the third horizontal scanning line and the fourth horizontal scanning line.

9. The apparatus as claimed in claim 6,
wherein said time interval is a time interval of three horizontal scanning lines of the progressive scanning.

* * * * *